(12) United States Patent
Molina et al.

(10) Patent No.: US 12,736,012 B2
(45) Date of Patent: Sep. 15, 2026

(54) SYSTEMS AND METHODS FOR OPERATING AN AIRCRAFT ENGINE USING MULTIPLE FUEL TYPES

(71) Applicant: Pratt & Whitney Canada Corp., Longueuil (CA)

(72) Inventors: Charlie Molina, Brampton (CA); Alessio Salerno, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/927,490

(22) Filed: Oct. 25, 2024

(65) Prior Publication Data

US 2026/0117710 A1 Apr. 30, 2026

(51) Int. Cl.
*F02C 9/26* (2006.01)
*F02C 7/14* (2006.01)
*F23R 3/36* (2006.01)

(52) U.S. Cl.
CPC ................ *F02C 9/263* (2013.01); *F02C 7/14* (2013.01); *F23R 3/36* (2013.01); *F05D 2220/323* (2013.01)

(58) Field of Classification Search
CPC .... F02C 3/22; F02C 7/224; F02C 9/40; F23R 3/36; F23K 2900/05004
See application file for complete search history.

(56) References Cited

U.S. PATENT DOCUMENTS 11,760,502 B2 9/2023 Palmer
11,885,260 B2 1/2024 Boucher
12,006,878 B2 6/2024 Brady
2008/0098746 A1* 5/2008 Iasillo ........................ F02C 3/22 60/776
2013/0042624 A1* 2/2013 Botarelli ................... F23R 3/36 60/772
2013/0192246 A1* 8/2013 Kamath .................... F23R 3/36 60/776
2022/0178306 A1* 6/2022 Durand ..................... F02C 7/22
2023/0015930 A1* 1/2023 Meshkin Fam ........ B64D 37/30
2023/0243311 A1 8/2023 Brady

FOREIGN PATENT DOCUMENTS

JP S60192837 A 10/1985

OTHER PUBLICATIONS

EP Search Report for EP Patent Application No. 25211501.9 dated Jun. 26, 2026.

* cited by examiner

*Primary Examiner* — Phutthiwat Wongwian
*Assistant Examiner* — Roberto Toshiharu Igue
(74) *Attorney, Agent, or Firm* — Getz Balich LLC

(57) ABSTRACT

An aircraft propulsion system includes a combustor, an engine oil system, a fuel system assembly, and a control system. The engine oil system includes a fuel-oil heat exchanger. The fuel system assembly includes a jet fuel system and a hydrogen fuel system. The jet fuel system and the hydrogen fuel system are connected in fluid communication with the combustor. The control system is configured to operate the fuel system assembly in one of a first fuel mode to direct a jet fuel from the jet fuel system through the fuel-oil heat exchanger or a second fuel mode to direct a hydrogen fuel from the hydrogen fuel system through the fuel-oil heat exchanger.

20 Claims, 10 Drawing Sheets

76
Oil Pump
130
80
FOHE
134
72
148
Oil Temp. Sensor
34
84
Oil Loads
132
Switching Valve
128
126
36
90
138
Engine Controller
Hydrogen Controller
140
86
38
108
116
88
104
LP stage
HP stage
94
102
Pressured H2 (GAS) Supply
100
92
124
Metering Valve
Pressure Relief Valve
114
Metering System
Servo Reg.
112
96
122
110
98
IGVA
120
IGVA Servo
118
Inlet Guide Vanes
42

SYSTEMS AND METHODS FOR OPERATING AN AIRCRAFT ENGINE USING MULTIPLE FUEL TYPES

TECHNICAL FIELD

This disclosure relates to fuel systems for aircraft engines and, more particularly, fuel systems using both jet fuel and hydrogen fuel.

BACKGROUND OF THE ART

Traditionally, gas turbine engines designed for use on aircraft use jet fuel (e.g., kerosene-based fuels). More recently, environmental concerns have prompted consideration of aircraft gas turbine engines which are additionally configured to use hydrogen fuel for combustion. Various jet fuel and hydrogen fuel systems for aircraft gas turbine engines, and methods for their use, are known in the art. While these known systems and methods may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system includes a combustor section, an engine oil system, a fuel system assembly, and a control system. The combustor section includes a combustor forming a first portion of a core flow path through the aircraft propulsion system. The engine oil system includes a fuel-oil heat exchanger. The fuel system assembly includes a jet fuel system, a hydrogen fuel system and a switching valve. The jet fuel system is connected in fluid communication with the combustor and the switching valve. The hydrogen fuel system is connected in fluid communication with the combustor and the switching valve. The control system includes an engine controller connected in signal communication with the switching valve. The engine controller includes a first processing system. The first processing system includes a first processor connected in signal communication with a non-transitory first memory storing first instructions which, when executed by the first processor, cause the first processor to operate the fuel system assembly in one of a first fuel mode or a second fuel mode and configure the switching valve with one of a first circuit flow path for the first fuel mode or a second circuit flow path for the second fuel mode. The switching valve with the first circuit flow path is configured to direct a jet fuel from the jet fuel system through the fuel-oil heat exchanger. The switching valve with the second circuit flow path is configured to direct a hydrogen fuel from the hydrogen fuel system through the fuel-oil heat exchanger.

In any of the aspects or embodiments described above and herein, the jet fuel system may include a jet fuel metering system connected in fluid communication between the switching valve and the combustor, the jet fuel metering system may be connected in signal communication with the engine controller, and the first instructions, when executed by the first processor, may cause the first processor to control the jet fuel metering system to direct the jet fuel to the combustor.

In any of the aspects or embodiments described above and herein, the hydrogen fuel system may include a hydrogen fuel metering system connected in fluid communication between the switching valve and the combustor and the control system may further include a hydrogen controller connected in signal communication with the engine controller and the hydrogen fuel metering system, the hydrogen controller may include a second processing system, the second processing system may include a second processor connected in signal communication with a non-transitory second memory storing second instructions which, when executed by the second processor, cause the second processor to control the hydrogen fuel metering system to direct the hydrogen fuel to the combustor.

In any of the aspects or embodiments described above and herein, the hydrogen fuel system may include a gaseous hydrogen source, and the hydrogen fuel metering system may be connected in fluid communication with and between the gaseous hydrogen source, the switching valve, and the combustor.

In any of the aspects or embodiments described above and herein, the hydrogen fuel metering system may include a pressure relief valve and a metering valve, the pressure relief valve may be connected in fluid communication with and between the gaseous hydrogen source and a hydrogen inlet of the switching valve, and the metering valve may be connected in fluid communication with and between a hydrogen outlet of the switching valve and the combustor.

In any of the aspects or embodiments described above and herein, the hydrogen fuel system may include a liquid hydrogen source and a pump, the pump may be connected in fluid communication with and between the liquid hydrogen source and the hydrogen fuel metering system, and the hydrogen fuel metering system may be connected in fluid communication with and between the pump, the switching valve, and the combustor.

In any of the aspects or embodiments described above and herein, the hydrogen fuel metering system may include a pressure relief valve and a metering valve, the pressure relief valve may be connected in fluid communication with and between the liquid hydrogen source and a hydrogen inlet of the switching valve, and the metering valve may be connected in fluid communication with and between a hydrogen outlet of the switching valve and the combustor.

In any of the aspects or embodiments described above and herein, the aircraft propulsion system may further include a compressor section forming a second portion of the core flow path, the compressor section may include an inlet guide vane assembly, the inlet guide vane assembly may include a plurality of inlet guide vanes, an inlet guide vane actuator (IGVA), and an IGVA servo, the plurality of inlet guide vanes may be positionable to control an air flow direction of an air flow at the second portion of the core flow path, the IGVA may be operably coupled with the plurality of inlet guide vanes, the IGVA servo may be connected in fluid communication with the IGVA, and the jet fuel system may be connected in fluid communication with the IGVA servo.

In any of the aspects or embodiments described above and herein, the engine controller may be connected in signal communication with the IGVA servo, and the first instructions, when executed by the first processor, may further cause the first processor to control the IGVA servo to direct the jet fuel to the IGVA to control a position of the plurality of inlet guide vanes in the first fuel mode and the second fuel mode.

In any of the aspects or embodiments described above and herein, wherein the first instructions, when executed by the first processor, further cause the first processor to operate the fuel system assembly in one of the first fuel mode, the second fuel mode, or a third fuel mode and, in the third fuel mode, configure the switching valve with both of the first circuit flow path and the second circuit flow path.

According to another aspect of the present disclosure, an aircraft propulsion system includes a combustor section, a heat exchanger, a fuel system assembly, and a control system. The combustor section includes a combustor forming a first portion of a core flow path through the aircraft propulsion system. The fuel system assembly includes a jet fuel system, a hydrogen fuel system, and a switching valve. The jet fuel system includes a jet fuel metering system connected in fluid communication with the combustor and the switching valve. The hydrogen fuel system includes a hydrogen fuel metering system connected in fluid communication with the combustor and the switching valve. The control system includes an engine controller connected in signal communication with the switching valve. The engine controller includes a first processing system. The first processing system includes a first processor connected in signal communication with a non-transitory first memory storing first instructions which, when executed by the first processor, cause the first processor to operate the fuel system assembly in one of a first fuel mode or a second fuel mode and configure the switching valve with one of a first circuit flow path for the first fuel mode or a second circuit flow path for the second fuel mode. The switching valve with the first circuit flow path is configured to direct a jet fuel from the jet fuel system through the fuel-oil heat exchanger and to the combustor through the jet fuel metering system. The switching valve with the second circuit flow path is configured to direct a hydrogen fuel from the hydrogen fuel system through the fuel-oil heat exchanger and to the combustor through the hydrogen fuel metering system.

In any of the aspects or embodiments described above and herein, the aircraft propulsion system may further include a compressor section forming a second portion of the core flow path, the compressor section may include an inlet guide vane assembly, the inlet guide vane assembly may include a plurality of inlet guide vanes, an inlet guide vane actuator (IGVA), and an IGVA servo, the plurality of inlet guide vanes may be positionable to control an air flow direction of an air flow at the second portion of the core flow path, the IGVA may be operably coupled with the plurality of inlet guide vanes, the IGVA servo may be connected in fluid communication with the IGVA, and the jet fuel system may be connected in fluid communication with the IGVA servo.

In any of the aspects or embodiments described above and herein, the engine controller may be connected in signal communication with the IGVA servo, and the first instructions, when executed by the first processor, may further cause the first processor to control the IGVA servo to direct the jet fuel to the IGVA to control a position of the plurality of inlet guide vanes in the first fuel mode and the second fuel mode.

In any of the aspects or embodiments described above and herein, the control system may further include a hydrogen controller connected in signal communication with the engine controller and the hydrogen fuel metering system, the hydrogen controller may include a second processing system, the second processing system may include a second processor connected in signal communication with a non-transitory second memory storing second instructions which, when executed by the second processor, may cause the second processor to control, in the second fuel mode, the hydrogen fuel metering system to direct the hydrogen fuel to the combustor from the switching valve.

In any of the aspects or embodiments described above and herein, wherein the first instructions, when executed by the first processor, further cause the first processor to operate the fuel system assembly in one of the first fuel mode, the second fuel mode, or a third fuel mode and, in the third fuel mode, configure the switching valve with both of the first circuit flow path and the second circuit flow path.

According to another aspect of the present disclosure, an aircraft propulsion system includes a combustor section, an engine oil system, a fuel system, and a control system. The combustor section includes a combustor forming a first portion of a core flow path through the aircraft propulsion system. The engine oil system includes a fuel-oil heat exchanger. The fuel system assembly includes a jet fuel system, a hydrogen fuel system and a switching valve. The jet fuel system includes a low-pressure stage pump, a high-pressure stage pump, and a jet fuel metering system forming a jet fuel flow path. The jet fuel metering system is connected in fluid communication with and between the high-pressure stage pump and the combustor. The hydrogen fuel system includes a hydrogen fuel flow path. The hydrogen fuel system includes a hydrogen fuel source and a hydrogen fuel metering system forming the hydrogen fuel flow path. The hydrogen fuel metering system is connected in fluid communication with and between the hydrogen fuel source, the switching valve, and the combustor. The control system includes an engine controller connected in signal communication with the switching valve. The engine controller includes a first processing system. The first processing system includes a first processor connected in signal communication with a non-transitory first memory storing first instructions which, when executed by the first processor, cause the first processor to operate the fuel system assembly in one of a first fuel mode or a second fuel mode and configure the switching valve with one of a first circuit flow path for the first fuel mode or a second circuit flow path for the second fuel mode. The switching valve with the first circuit flow path is configured to direct a jet fuel from the low-pressure stage pump, through the fuel-oil heat exchanger, and to the high-pressure stage pump along the jet fuel flow path. The switching valve with the second circuit flow path is configured to direct a hydrogen fuel from the hydrogen fuel metering system, through the fuel-oil heat exchanger, and to the hydrogen fuel metering system along the hydrogen fuel flow path.

In any of the aspects or embodiments described above and herein, the aircraft propulsion system may further include a compressor section forming a second portion of the core flow path, the compressor section may include an inlet guide vane assembly, the inlet guide vane assembly may include a plurality of inlet guide vanes, an inlet guide vane actuator (IGVA), and an IGVA servo, the plurality of inlet guide vanes may be positionable to control an air flow direction of an air flow at the second portion of the core flow path, the IGVA may be operably coupled with the plurality of inlet guide vanes, the IGVA servo may be connected in fluid communication with the IGVA, and the jet fuel system may be connected in fluid communication with the IGVA servo.

In any of the aspects or embodiments described above and herein, the engine controller may be connected in signal communication with the IGVA servo, and the first instructions, when executed by the first processor, may further cause the first processor to control the IGVA servo to direct the jet fuel to the IGVA to control a position of the plurality of inlet guide vanes in the first fuel mode and the second fuel mode.

In any of the aspects or embodiments described above and herein, the control system may further include a hydrogen controller connected in signal communication with the engine controller and the hydrogen fuel metering system, the hydrogen controller may include a second processing system, the second processing system may include a second processor connected in signal communication with a non-transitory second memory storing second instructions which, when executed by the second processor, may cause the second processor to control, in the second fuel mode, the hydrogen fuel metering system to direct the hydrogen fuel to the combustor from the switching valve.

In any of the aspects or embodiments described above and herein, wherein the first instructions, when executed by the first processor, further cause the first processor to operate the fuel system assembly in one of the first fuel mode, the second fuel mode, or a third fuel mode and, in the third fuel mode, configure the switching valve with both of the first circuit flow path and the second circuit flow path.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
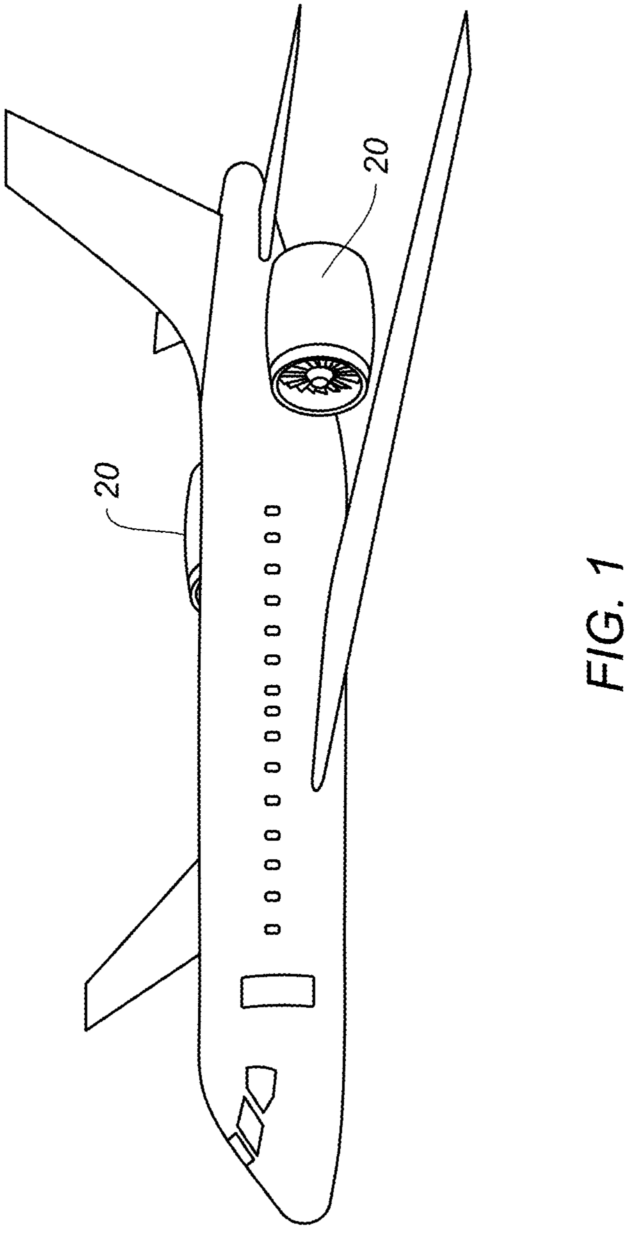
FIG. 1 illustrates a perspective view of an aircraft including a propulsion system, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
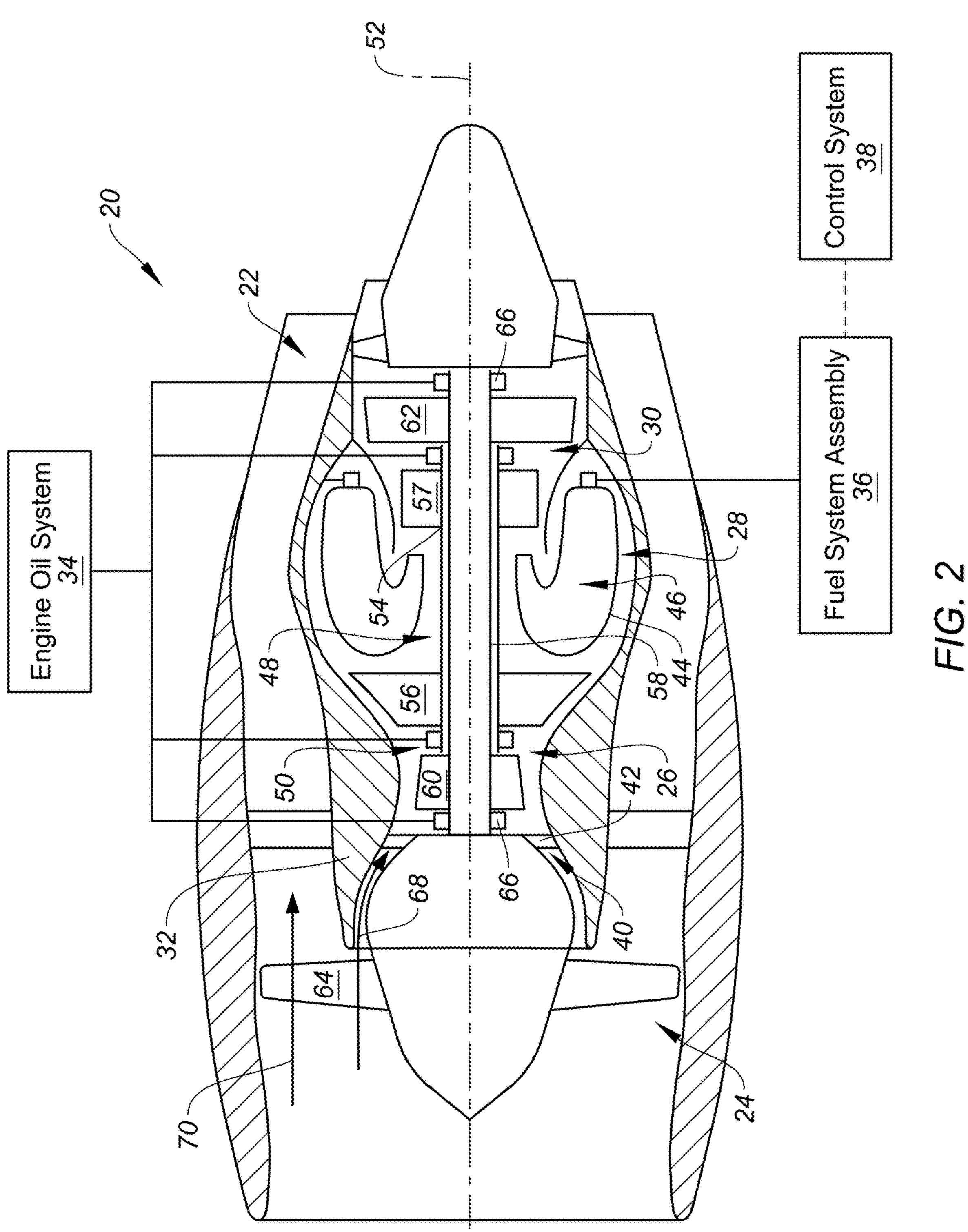
FIG. 2 schematically illustrates a cutaway, side view of an aircraft propulsion system including a gas turbine engine, in accordance with one or more embodiments of the present disclosure.

FIG. 2 schematically illustrates a cutaway, side view of the propulsion system 20. The propulsion system 20 of FIG. 2 includes a gas turbine engine 22. The gas turbine engine 22 of FIG. 2 is configured as a turbofan gas turbine engine. However, while the following description and accompanying drawings may refer to the turbofan gas turbine engine 22 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The gas turbine engine 22 of FIG. 2 includes a fan section 24, a compressor section 26, a combustor section 28, a turbine section 30, an engine static structure 32, an engine oil system 34, a fuel system assembly 36, and a control system 38. The compressor section 26 includes an inlet guide vane (IGV) assembly 40, a low-pressure compressor 26A, and a high-pressure compressor 26B. The IGV assembly 40 includes a plurality of variable-position inlet guide vanes 42 upstream of the low-pressure compressor 26A. The combustor section 28 includes a combustor 44 (e.g., an annular combustor) surrounding and forming a combustion chamber 46. The turbine section 30 of FIG. 2 includes a high-pressure turbine 30A and a low-pressure turbine 30B.

Components of the fan section 24, the compressor section 26, and the turbine section 30 form a first rotational assembly 48 (e.g., a high-pressure spool) and a second rotational assembly 50 (e.g., a low-pressure spool) of the gas turbine engine 22. The first rotational assembly 48 and the second rotational assembly 50 are mounted for rotation about a rotational axis 52 (e.g., an axial centerline) of the gas turbine engine 22 relative to the engine static structure 32.

The first rotational assembly 48 includes a first shaft 54, a bladed first compressor rotor 56 for the high-pressure compressor 26B, and a bladed first turbine rotor 57 for the high-pressure turbine 30A. The first shaft 54 interconnects the bladed first compressor rotor 56 and the bladed first turbine rotor 57.

The second rotational assembly 50 includes a second shaft 58, a bladed second compressor rotor 60 for the low-pressure compressor 26A, a bladed second turbine rotor 62 for the low-pressure turbine 30B, and a bladed fan rotor 64 for the fan section 24. The second shaft 58 of FIG. 2 interconnects the bladed second compressor rotor 60, the bladed second turbine rotor 62, and the bladed fan rotor 64.

The second shaft 58 may alternatively be connected to the bladed fan rotor 64 through a gear train configured, for example, to drive the bladed fan rotor 64 at a reduced rotational speed relative to the second shaft 58.

The engine static structure 32 includes one or more engine cases, cowlings, inner fixed structures, and/or other non-rotating structures configured to house and/or support components of the gas turbine engine sections 24, 26, 28, 30. The engine static structure 32 further includes a plurality of bearing assemblies 66 configured to rotationally support the first rotational assembly 48 (e.g., the first shaft 54) and the second rotational assembly 50 (e.g., the second shaft 58).

In operation of the gas turbine engine 22 of FIG. 2, ambient air is directed through the fan section 24 and into a core flow path 68 (e.g., an annular flow path) and a bypass flow path 70 (e.g., an annular flow path) by rotation of the bladed fan rotor 64. Airflow along the core flow path 68 is directed by the inlet guide vanes 42 and compressed by the low-pressure compressor 26A and the high-pressure compressor 26B. The inlet guide vanes 42 may be positioned (e.g., rotated) to control a direction of air into and through the compressor section 26 along the core flow path 68. The compressed air from the compressor section 26 is mixed and burned with fuel in the combustor 44 (e.g., the combustion chamber 46). The fuel is injected into the combustor 44 by the fuel system assembly 36. As will be discussed in further detail, the fuel injected by the fuel system assembly 36 into the combustor 44 may be a jet fuel (e.g., kerosene-based fuels, naphtha-based fuels, etc.), a hydrogen ($H_2$) fuel, or a combination of jet fuel and hydrogen fuel. Combustion gas from the combustor 44 is directed along the core flow path 68 through the high-pressure turbine 30A and the low-pressure turbine 30B. The bladed first turbine rotor 57 and the bladed second turbine rotor 62 rotationally drive the first rotational assembly 48 and the second rotational assembly 50, respectively, in response to the combustion gas flow through the high-pressure turbine 30A and the low-pressure turbine 30B. The bypass flow path 70 may be disposed outside the engine static structure 32. For example, the engine static structure 32 and an outer aircraft propulsion system housing (e.g., a nacelle) may form an annular bypass duct radially therebetween, and airflow may be directed through the annular bypass duct along the bypass flow path 70.

Figure 3:
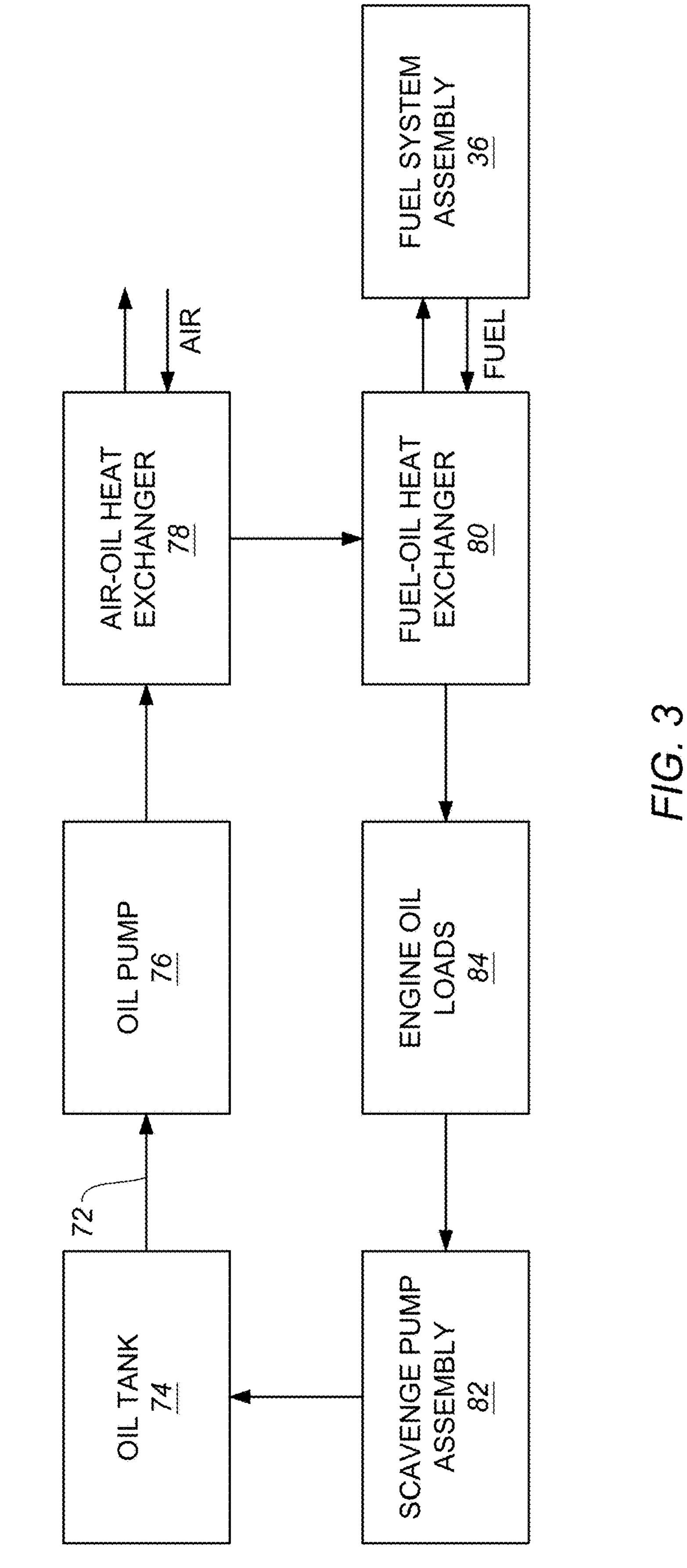
FIG. 3 schematically illustrates an engine oil system for an aircraft propulsion system, in accordance with one or more embodiments of the present disclosure.

FIG. 3 schematically illustrates the engine oil system 34. The engine oil system 34 of FIG. 3 includes an oil flow path 72. The engine oil system 34 further includes an oil tank 74, an oil pump 76, an air-oil heat exchanger 78, a fuel-oil heat exchanger (FOHE) 80, and a scavenge pump assembly 82 forming the oil flow path 72. The engine oil system 34 is configured to supply oil to engine oil loads 84 of the gas turbine engine 22 along the oil flow path 72 for lubrication and cooling of the engine oil loads 84. The engine oil loads 84 may include, for example, the bearing assemblies 66 (see FIG. 2). The engine oil loads 84 may additionally include, but are not limited to, gear train components, an accessory gear box (AGB), or other rotational equipment of the gas turbine engine 22. The oil pump 76 is configured to circulate oil from the oil tank 74 along the oil flow path 72. The oil may be cooled by the air-oil heat exchanger 78 and the fuel-oil heat exchanger 80 as the oil flows along the oil flow path 72. The air-oil heat exchanger 78 facilitates the transfer of heat energy from the oil to an air flow directed through the air-oil heat exchanger 78, for example, from the bypass flow path 70. The fuel-oil heat exchanger 80 facilitates the transfer of heat energy from the oil to fuel directed through the fuel-oil heat exchanger 80 from the fuel system assembly 36. This configuration of the fuel-oil heat exchanger 80 additionally facilitates heating the fuel from the fuel system assembly 36 prior to directing the fuel into the combustor 44 for combustion. Oil from the engine oil loads 84 is directed to return to the oil tank 74 by the scavenge pump assembly 82. For example, the scavenge pump assembly 82 may operate to direct (e.g., pump) oil from one or more of the engine oil loads 84, or an oil sump downstream of the engine oil loads 84, to the oil tank 74. Of course, the present disclosure is not limited to the particular configuration of the engine oil system 34 illustrated in FIG. 3.

Figure 4:
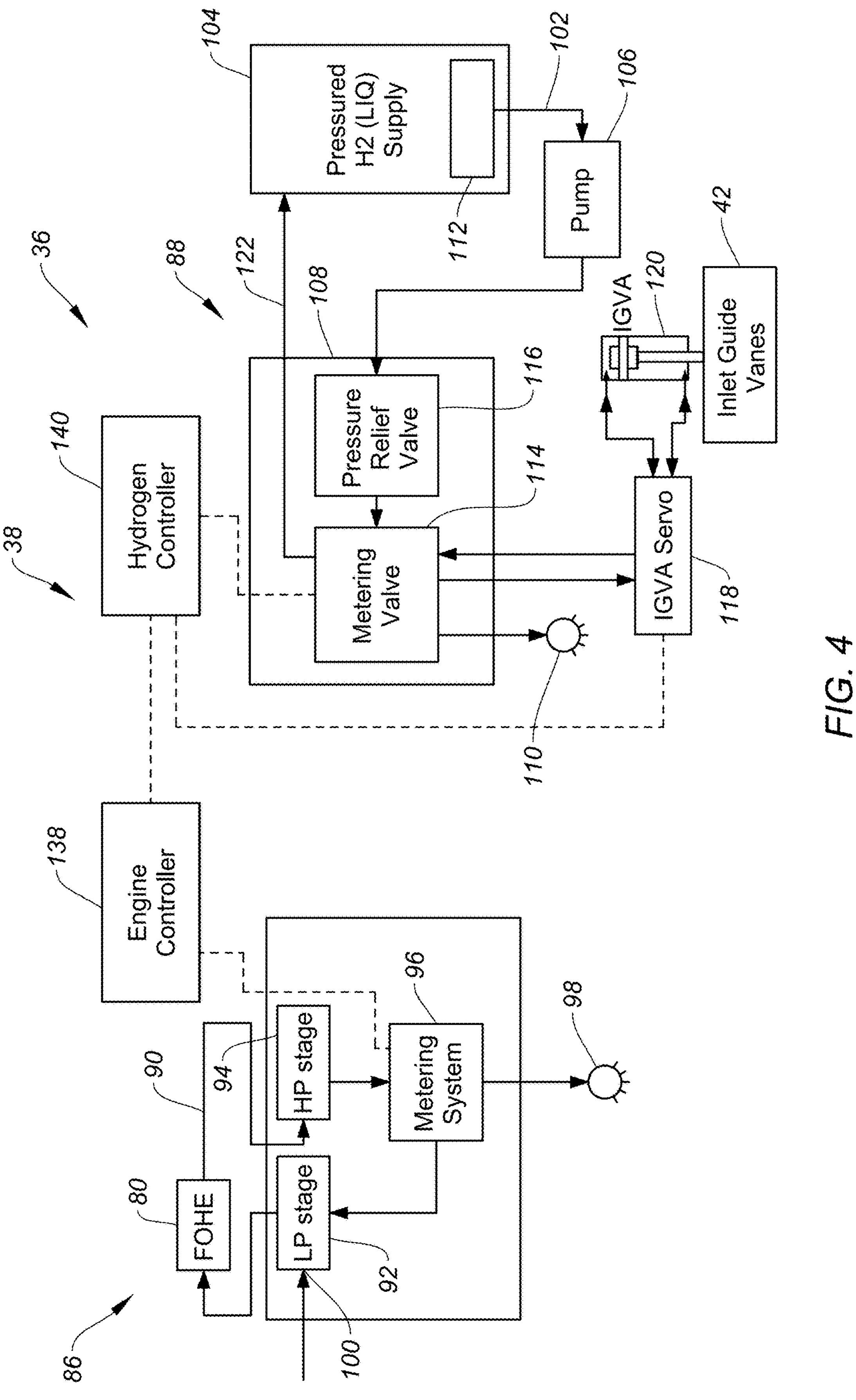
FIG. 4 schematically illustrates a fuel system assembly for an aircraft propulsion system, in accordance with one or more embodiments of the present disclosure.

FIG. 4 schematically illustrates the fuel system assembly 36 according to some embodiments of the present disclosure. The fuel system assembly 36 includes a jet fuel system 86 and a hydrogen fuel system 88. The jet fuel system 86 and the hydrogen fuel system 88 are configured to independently direct a fuel (e.g., jet fuel and hydrogen fuel respectively) into the combustor 44 for combustion within the combustion chamber 46. The jet fuel system 86 and the hydrogen fuel system 88 additionally facilitate operation of other components of the gas turbine engine 22 such as, but not limited to, the inlet guide vane assembly 40 and the fuel-oil heat exchanger 80.

The jet fuel system 86 includes a jet fuel flow path 90. The jet fuel system 86 includes a low-pressure (LP) stage pump 92, the fuel-oil heat exchanger 80, a high-pressure (HP) stage pump 94, a metering system 96, and a fuel manifold assembly 98 forming the jet fuel flow path 90. The LP stage pump 92 draws jet fuel from an inlet 100 connected, for example, in fluid communication with a jet fuel tank (e.g., a wing fuel tank) of the jet fuel system 86. The LP stage pump 92 is configured to direct (e.g., pump) the jet fuel, along the jet fuel flow path 90, through the fuel-oil heat exchanger 80, to facilitate cooling of the oil of the engine oil system 34 while also heating the jet fuel. The fuel-oil heat exchanger 80 is connected in fluid communication with and between the LP stage pump 92 and the HP stage pump 94. The HP stage pump 94 is configured to direct (e.g., pump) the jet fuel, along the jet fuel flow path 90, from the fuel-oil heat exchanger 80 to the metering system 96. The metering system 96 is connected in fluid communication with and between the HP stage pump 94 and the fuel manifold assembly 98. The metering system 96 is configured to control a flow rate of the jet fuel supplied to the fuel manifold assembly 98 for introduction into the combustor 44. The fuel manifold assembly 98 may include a single fuel manifold or a plurality of discrete fuel manifolds. The metering system 96 may be configured to apportion the jet fuel between the discrete fuel manifolds of the fuel manifold assembly 98, for example, with a flow divider valve connected in fluid communication with each of the fuel manifolds.

The hydrogen fuel system 88 includes a hydrogen fuel flow path 102. The hydrogen fuel system 88 includes a hydrogen fuel source 104, a pump 106, a metering system 108, and a fuel manifold assembly 110 forming the hydrogen fuel flow path 102. The hydrogen fuel source 104 includes one or more hydrogen tanks 112 configured for storage of a hydrogen fuel (e.g., a pressurized and/or liquid hydrogen fuel). The hydrogen fuel source 104 may additionally include refrigeration equipment as necessary to maintain the hydrogen fuel in a liquid state. The pump 106 is connected in fluid communication with and between the hydrogen fuel source 104 and the metering system 108. The pump 106 is configured to direct (e.g., pump) the liquid hydrogen fuel from the hydrogen fuel source 104 to the metering system 108. The metering system 108 is connected in fluid communication with and between the pump 106 and the fuel manifold assembly 110. The metering system 108 of FIG. 4 includes a metering valve 114. The metering system 108 may additionally include a pressure relief valve (PRV) 116 connected in fluid communication with and between the pump 106 and the metering valve 114. The metering valve 114 is configured to control a flow rate of the hydrogen fuel supplied to the fuel manifold assembly 110 for introduction into the combustor 44. The fuel manifold assembly 110 may include a single fuel manifold or a plurality of discrete fuel manifolds. The fuel manifold assembly 110 may include one or more fuel manifolds in common with the fuel manifold assembly 98. For example, the fuel manifold assembly 98, 110 may be configured to selectively direct jet fuel from the jet fuel system 86 into the combustor 44 or hydrogen fuel from the hydrogen fuel system 88 into the combustor 44.

The metering valve 114 of FIG. 4 is additionally connected in fluid communication with an inlet guide vane actuator (IGVA) servo 118 of the inlet guide vane assembly 40. The IGVA actuator 118 is connected in fluid communication with an IGVA 120 of the inlet guide vane assembly 40. The IGVA 120 is operably connected to the inlet guide vanes 42 to control a position of the inlet guide vanes 42 (see FIG. 2). For example, the IGVA 120 may be coupled with a synchronization ring coupled with each of the inlet guide vanes 42, or by another suitable mechanical interconnection for controlling positions of the inlet guide vanes 42. The IGVA servo 118 is configured to control liquid hydrogen fuel flow supplied to and returned from the IGVA 120 to position the IGVA 120, and thereby control the positions of the inlet guide vanes 42. The IGVA 120 (e.g., a linear hydraulic actuator) is configured as a "fuel-draulic" actuator configured to use the pressured liquid hydrogen fuel as a hydraulic power source for effecting movement of the inlet guide vanes 42. Excess liquid hydrogen fuel from the IGVA servo 118 may be directed to the combustor 44 by the metering valve 114 for combustion and/or returned to the hydrogen fuel source 104 by the metering valve 114 through a return line 122.

Figure 5:
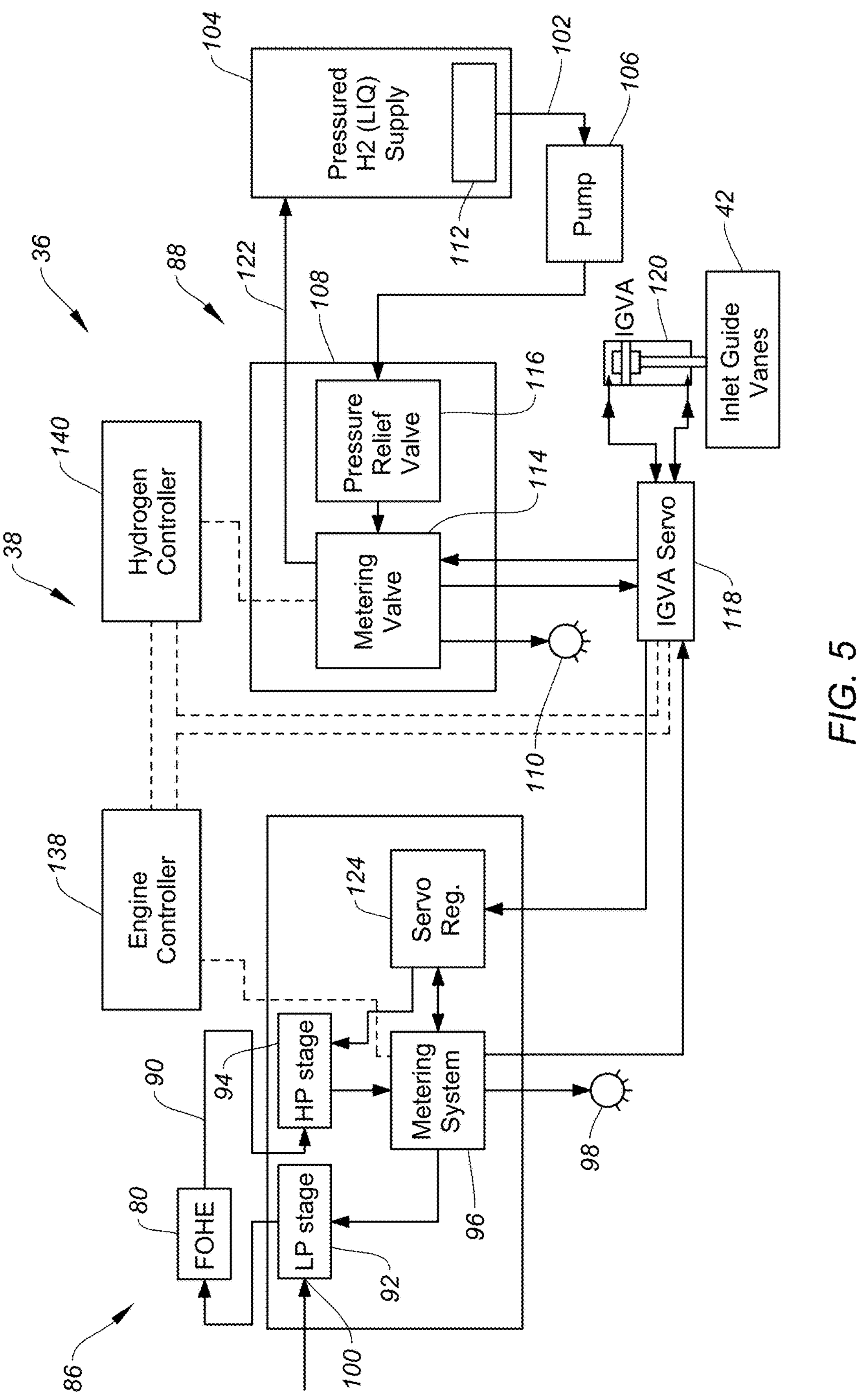
FIG. 5 schematically illustrates another fuel system assembly for an aircraft propulsion system, in accordance with one or more embodiments of the present disclosure.

Referring to FIG. 5, in some embodiments of the fuel system assembly 36, both the jet fuel system 86 and the hydrogen fuel system 88 may be connected in fluid communication with the IGVA servo 118. The metering valve 114 of FIG. 5 is connected in fluid communication with the IGVA servo 118, as discussed above, to facilitate operation of the IGVA 120 using hydrogen fuel from the hydrogen fuel system 88. The metering system 96 of FIG. 5 is also connected in fluid communication with the IGVA servo 118 to facilitate operation of the IGVA 120, independent of the hydrogen fuel system 88, using jet fuel from the jet fuel system 86. The jet fuel system 86 may further include a servo regulator 124. The servo regulator 124 may be connected in fluid communication with and between the IGVA servo 118, the HP stage pump 94, and the metering system 96. The servo regulator 124 may be configured to direct jet fuel return flow from the IGVA servo 118 to one or both of the HP stage pump 94 and the metering system 96. Alternatively, the metering system 96 may be directly connected in fluid communication with the IGVA servo 118 to receive the jet fuel return flow from the IGVA servo 118. The fuel system assembly 36 configuration of FIG. 5 facilitates operation of the IGVA 120 using either of the jet fuel system 86 or the hydrogen fuel system 88, thereby allowing the hydrogen fuel system 88 of FIG. 5 to be shut down (e.g., securing a flow of the hydrogen fuel through the hydrogen fuel system 88) when the jet fuel system 86 is operating to supply jet fuel to the combustor 44 and allowing the jet fuel system 86 of FIG. 5 to be shut down (e.g., securing a flow of the jet fuel through the jet fuel system 86) when the hydrogen fuel system 88 is operating to supply hydrogen fuel to the combustor 44. The IGVA servo 118 and the IGVA 120 may include discrete, internal fluid flow paths (e.g., isolated from fluid communication with one another) for each of the jet fuel system 86 and the hydrogen fuel system 88. Alternatively, however, the IGVA servo 118 and the IGVA 120 may form a common, internal fluid flow path used by both the jet fuel system 86 and the hydrogen fuel system 88.

Figure 6:
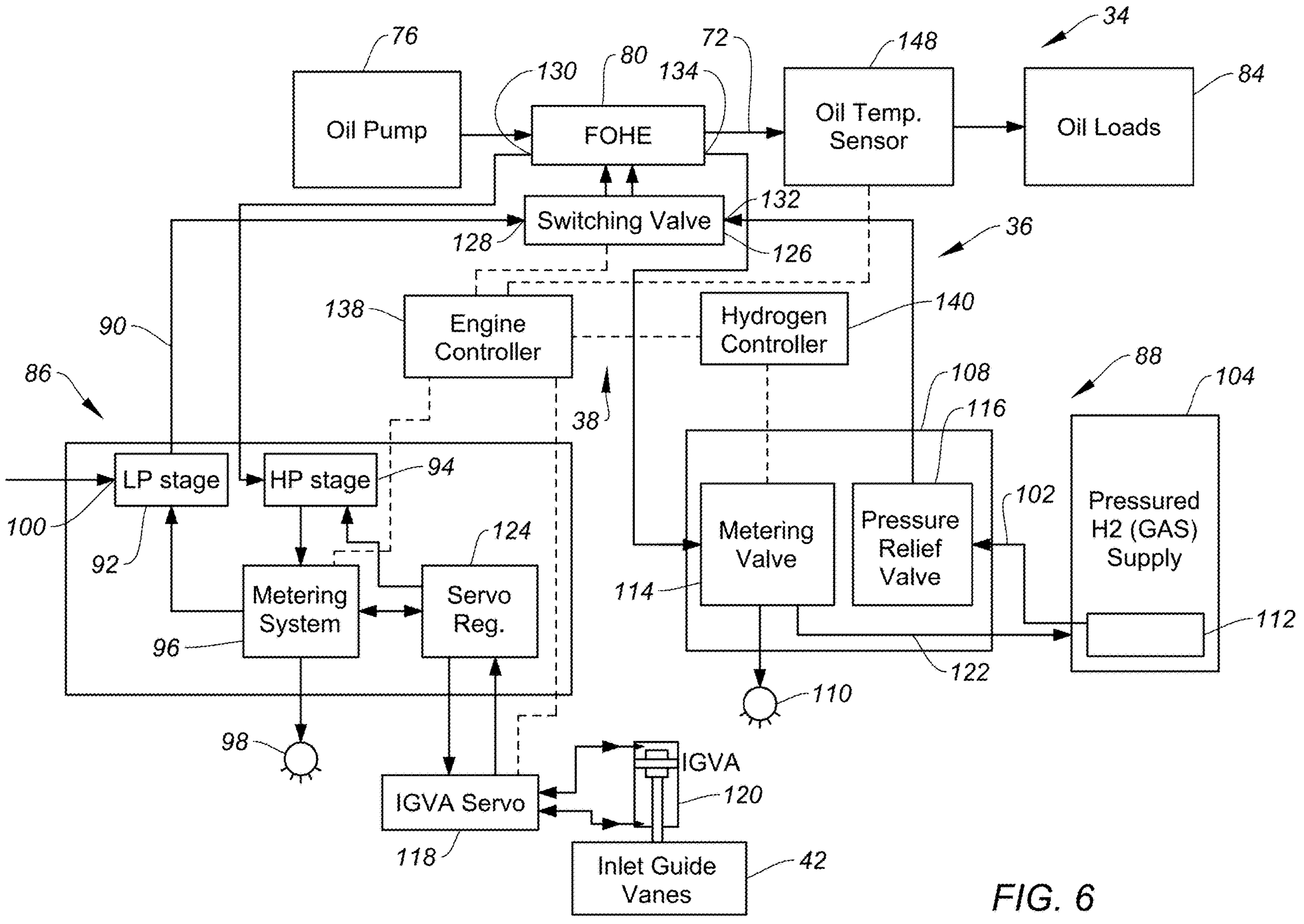
FIG. 6 schematically illustrates another fuel system assembly for an aircraft propulsion system, in accordance with one or more embodiments of the present disclosure.

Referring to FIG. 6, in some embodiments of the engine oil system 34 and the fuel system assembly 36, both the jet fuel system 86 and the hydrogen fuel system 88 may be selectively connected in fluid communication with the fuel-oil heat exchanger 80. The fuel system assembly 36 of FIG. 6 includes a switching valve 126. The switching valve 126 includes a first inlet 128 and a second inlet 132. The fuel-oil heat exchanger 80 includes a first outlet 130 and a second outlet 134. The first inlet 128 is connected in fluid communication with the LP stage pump 92. The first outlet 130 is connected in fluid communication with the HP stage pump 94. The second inlet 132 is connected in fluid communication with the metering system 108, for example, downstream of the pressure relief valve 116. The second outlet 134 is connected in fluid communication with the metering valve 114. The switching valve 126 is configurable in one of a first circuit flow path and a second circuit flow path. The switching valve 126 and the fuel-oil heat exchanger 80 may include discrete, internal fluid flow paths (e.g., isolated from fluid communication with one another) for each of the jet fuel system 86 and the hydrogen fuel system 88. Alternatively, however, the switching valve 126 and the fuel-oil heat exchanger 80 may form a common, internal fluid flow path used by both the jet fuel system 86 and the hydrogen fuel system 88. With the switching valve 126 configured in the first circuit flow path, jet fuel is directed by the switching valve 126 from the jet fuel system 86 at the first inlet 128, through the fuel-oil heat exchanger 80, and returned to the jet fuel system 86 at the first outlet 130 to facilitate cooling for the oil of the oil system 34 using the jet fuel. With the switching valve 126 configured in the second circuit flow path, hydrogen fuel is directed by the switching valve 126 from the hydrogen fuel system 88 at the second inlet 132, through the fuel-oil heat exchanger 80, and returned to the hydrogen fuel system 88 at the second outlet 134 to facilitate cooling for the oil of the oil system 34 using the hydrogen fuel. In some embodiments, the switching valve 126 may additionally be configurable to complete both the first circuit flow path and the second circuit flow path to direct (simultaneously) both jet fuel (from the jet fuel system 86) and hydrogen fuel (e.g., from the hydrogen fuel system 88) through the fuel-oil heat exchanger 80. The fuel system assembly 36 configuration of FIG. 6 facilitates operation of the fuel-oil heat exchanger 80 using either of the jet fuel system 86 or the hydrogen fuel system 88, thereby allowing the hydrogen fuel system 88 of FIG. 6 to be shut down (e.g., securing a flow of the hydrogen fuel through the hydrogen fuel system 88) when the jet fuel system 86 is operating to supply jet fuel to the combustor 44. The hydrogen fuel system 88 of FIG. 6 is configured to operate using gaseous hydrogen fuel, in contrast to the hydrogen fuel system 88 described above with respect to FIGS. 4 and 5. In this fuel system assembly 36 embodiment of FIG. 6, the IGVA servo 118 is connected in fluid communication with the jet fuel system 86 (e.g., only the jet fuel system 86) to facilitate operation of the IGVA 120 and the inlet guide vanes 42 (see FIG. 2).

Figure 7:
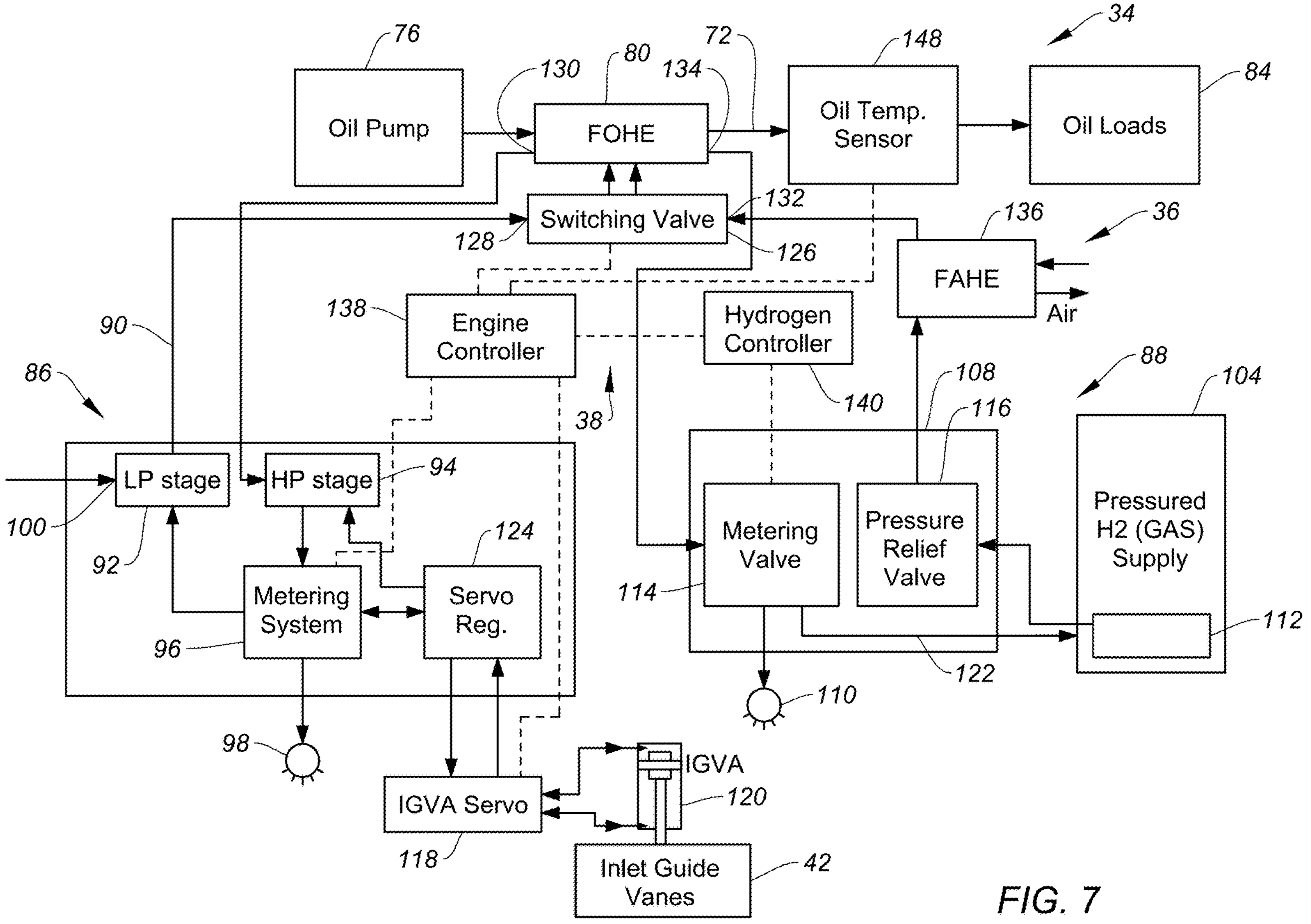
FIG. 7 schematically illustrates another fuel system assembly for an aircraft propulsion system, in accordance with one or more embodiments of the present disclosure.

Referring to FIG. 7, in some embodiments of the engine oil system 34 and the fuel system assembly 36, the fuel system assembly 36 (e.g., the fuel system assembly 36 of FIG. 6) may additionally include a fuel-air heat exchanger (FAHE) 136 configured to heat the gaseous hydrogen fuel from the metering system 108 prior to directing the gaseous hydrogen fuel into the fuel-oil heat exchanger 80. The fuel-air heat exchanger 136 facilitates the transfer of heat energy from an air flow (e.g., bypass air flow, compressor bleed air flow, etc.) to the gaseous hydrogen fuel, thereby reducing the burden on the fuel-oil heat exchanger 80 alone for heating the gaseous hydrogen fuel.

Figure 8:
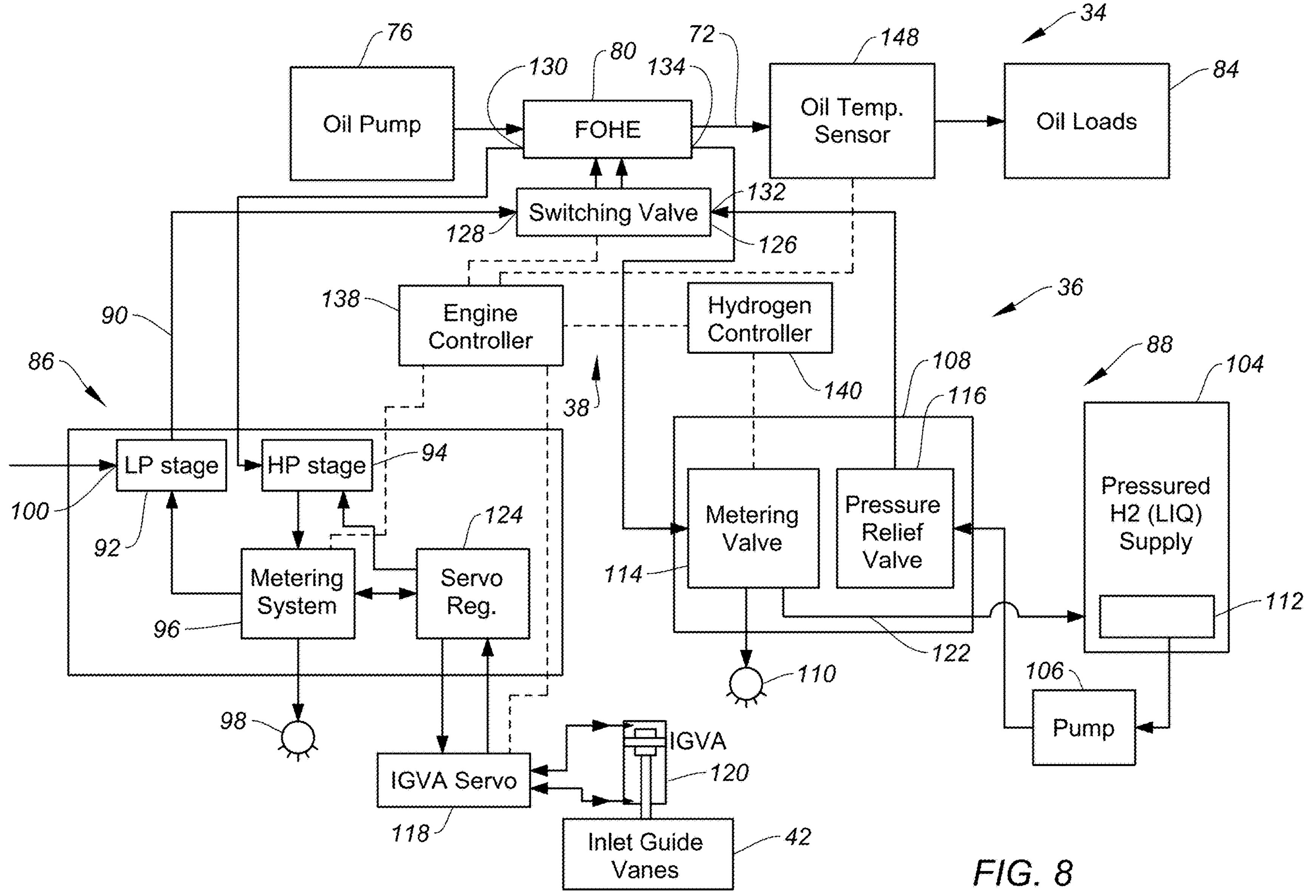
FIG. 8 schematically illustrates another fuel system assembly for an aircraft propulsion system, in accordance with one or more embodiments of the present disclosure.

FIG. 8 illustrates another embodiment of the engine oil system 34 and the fuel system assembly 36, similar to the engine oil system 34 and the fuel system assembly 36 of FIG. 6, but in which the hydrogen fuel system 88 of FIG. 6 is configured to operate using liquid hydrogen fuel. The pump 106 is configured to direct (e.g., pump) the liquid hydrogen fuel from the hydrogen fuel source 104 to the metering system 108. The second inlet 132 is connected in fluid communication with the metering system 108, for example, downstream of the pressure relief valve 116. The second outlet 134 is connected in fluid communication with the metering valve 114. The switching valve 126 is configurable between a first circuit flow path and a second circuit flow path. With the switching valve 126 configured in the first circuit flow path, jet fuel is directed from the jet fuel system 86 at the first inlet 128, through the fuel-oil heat exchanger 80, and returned to the jet fuel system 86 at the first outlet 130 to facilitate cooling for the oil of the oil system 34 using the jet fuel. With the switching valve 126 configured in the second circuit flow path, hydrogen fuel is directed from the hydrogen fuel system 88 at the second inlet 132, through the fuel-oil heat exchanger 80, and returned to the hydrogen fuel system 88 at the second outlet 134 to facilitate cooling for the oil of the oil system 34 using the hydrogen fuel. The hydrogen fuel, heated passing through the fuel-oil heat exchanger 80, may subsequently be directed to the combustor 44 by the metering system 108. The heating of the hydrogen fuel in the fuel-oil heat exchanger 80 may facilitate a phase change of the hydrogen fuel, from a liquid hydrogen to a gaseous hydrogen, in preparation for introducing the hydrogen fuel (e.g., the gaseous hydrogen fuel) into the combustor 44 for combustion. In this fuel system assembly 36 embodiment of FIG. 8, the IGVA servo 118 is connected in fluid communication with the jet fuel system 86 (e.g., only the jet fuel system 86) to facilitate operation of the IGVA 120 and the inlet guide vanes 42 (see FIG. 2). The fuel system assembly 36 configuration of FIG. 8 facilitates operation of the fuel-oil heat exchanger 80 using either of the jet fuel system 86 or the hydrogen fuel system 88, thereby allowing the hydrogen fuel system 88 of FIG. 6 to be shut down (e.g., securing a flow of the hydrogen fuel through the hydrogen fuel system 88) when the jet fuel system 86 is operating to supply jet fuel to the combustor 44. However, in some embodiments, the IGVA servo 118 may alternatively be connected in fluid communication with the hydrogen fuel system 88 (e.g., only the hydrogen fuel system 88), for example, as described above with respect to the fuel system assembly 36 of FIG. 4. This alternative configuration of the fuel system assembly 36 facilitates operation of the fuel-oil heat exchanger 80 using either of the jet fuel system 86 or the hydrogen fuel system 88, thereby allowing the jet fuel system 86 of FIG. 6 to be shut down (e.g., securing a flow of the jet fuel through the jet fuel system 86) when the hydrogen fuel system 88 is operating to supply hydrogen fuel to the combustor 44. In still some other embodiments, the IGVA servo 118 may alternatively be connected in fluid communication with both the jet fuel system 86 and the hydrogen fuel system 88, for example, as described above with respect to the fuel system assembly 36 of FIG. 5. This alternative configuration of the fuel system assembly 36 facilitates operation of the fuel-oil heat exchanger 80 using either of the jet fuel system 86 or the hydrogen fuel system 88, thereby allowing either one of the jet fuel system 86 of FIG. 6 or the hydrogen fuel system 88 of FIG. 6 to be shut down when the other of the jet fuel system 86 or the hydrogen fuel system 88 is operating to supply fuel to the combustor 44.

Figure 9:
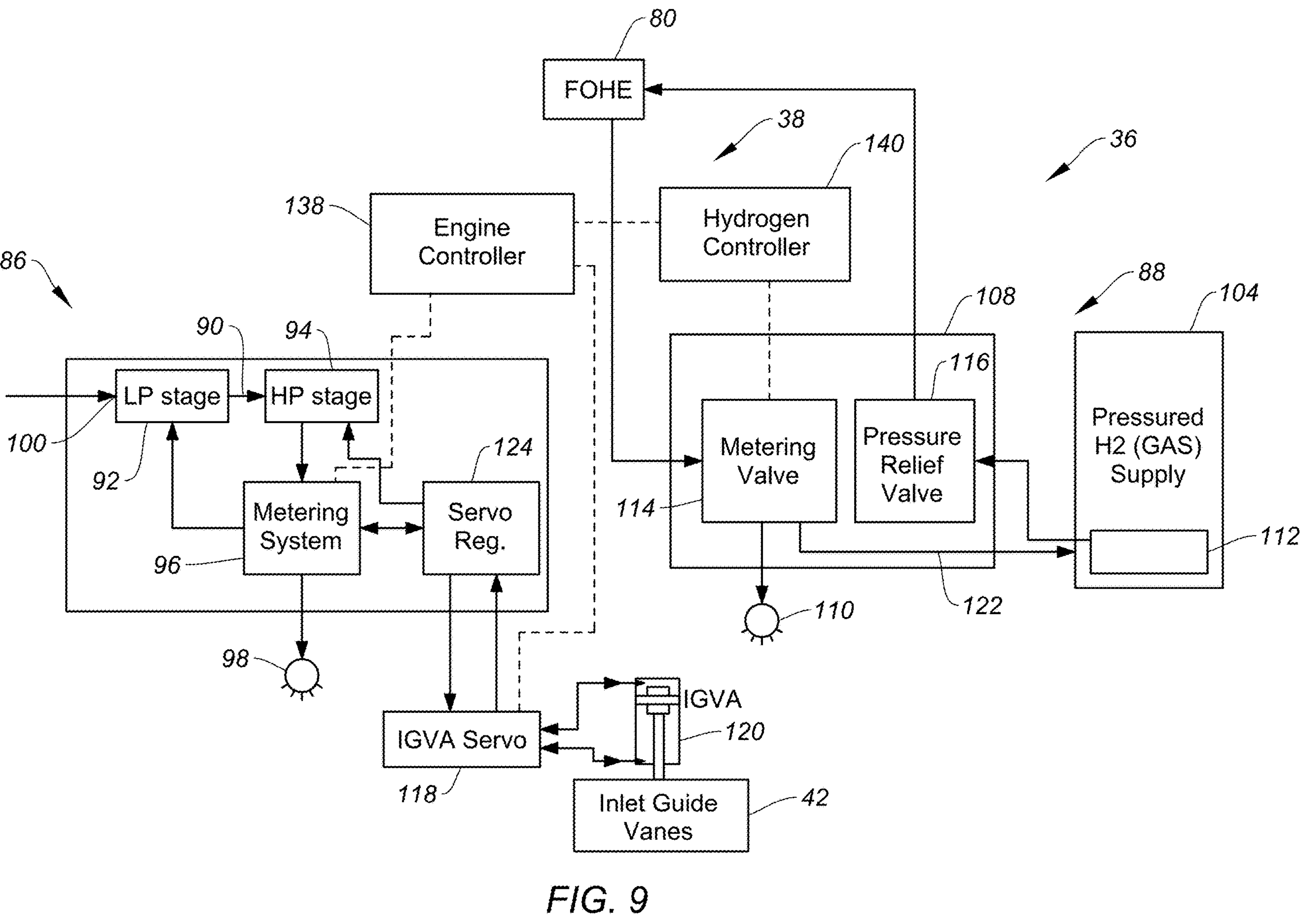
FIG. 9 schematically illustrates another fuel system assembly for an aircraft propulsion system, in accordance with one or more embodiments of the present disclosure.

Referring to FIG. 9, in some embodiments of the engine oil system 34 and the fuel system assembly 36, the hydrogen fuel system 88 (e.g., only the hydrogen fuel system 88) is connected in fluid communication with the fuel-oil heat exchanger 80. The fuel-oil heat exchanger 80 is connected in fluid communication with the metering system 108 to receive hydrogen fuel from the metering system 108, for example, downstream of the pressure relief valve 116. The fuel-oil heat exchanger 80 is connected in fluid communication with the metering valve 114 to return the hydrogen fuel to the metering system 108. Hydrogen fuel returned from the fuel-oil heat exchanger 80 may be directed to the combustor 44 by the metering valve 114 for combustion and/or returned to the hydrogen fuel source 104 by the metering valve 114 through the return line 122. The hydrogen fuel system 88 of FIG. 9 is configured to operate using gaseous hydrogen fuel; however, the hydrogen fuel system 88 may alternatively be configured to operate using liquid hydrogen fuel. In this alternative configuration, the hydrogen fuel system 88 may additionally be connected in fluid communication with the IGVA servo 118 to facilitate operation of the IGVA 120 and the inlet guide vanes as described above with respect to FIG. 4.

Figure 10:
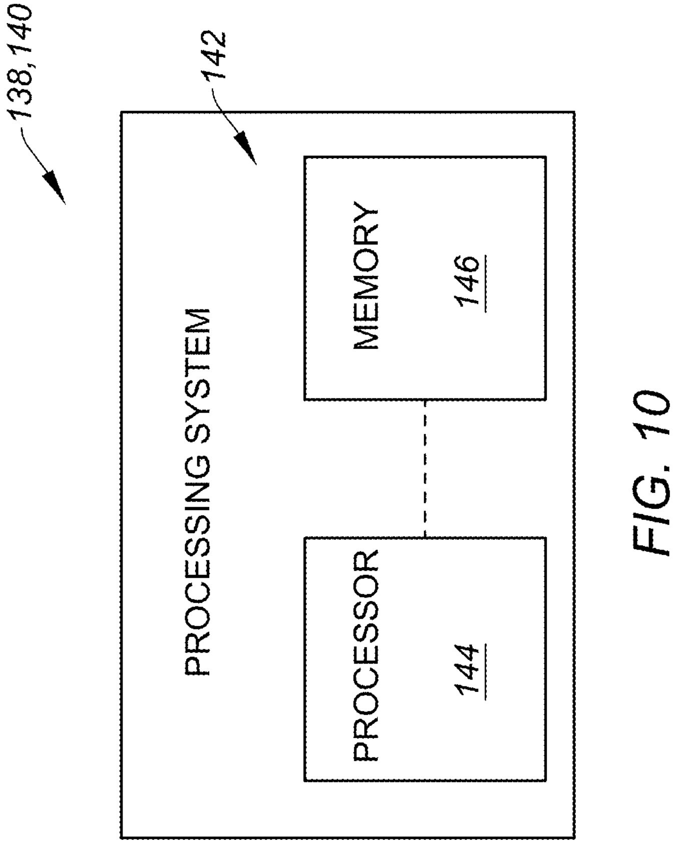
FIG. 10 schematically illustrates a controller processing system for an aircraft propulsion system, in accordance with one or more embodiments of the present disclosure.

Referring again to FIGS. 4-10, the control system 38 includes an engine controller 138 and a hydrogen controller 140. Each of the controllers 138, 140 includes a discrete processing system 142. FIG. 10 schematically illustrates the processing system 142. The processing system 142 includes a processor 144 connected in signal communication with memory 146. The processor 144 may include any type of computing device, computational circuit, processor(s), central processing unit (CPU), graphics processing unit (GPU), computer, or the like capable of executing a series of instructions that are stored in memory 146. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the processing system 142 and its processor 144 to accomplish the same algorithmically and/or coordination of gas turbine engine 22 components including, but not limited to, components of the fuel system 36. The memory 146 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the respective one of the engine controller 138 or the hydrogen controller 140. The processing system 142 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the processing system 142 and external electrical or electronic devices may be via a hardwire connection or via a wireless connection. A person of skill in the art will recognize that portions of the processing system 142 may assume various forms (e.g., digital signal processor, analog device, etc.).

The engine controller 138 may form or otherwise be part of an electronic engine controller (EEC) for the gas turbine engine 22. The EEC may control operating parameters of the gas turbine engine 22 including, but not limited to, fuel flow, stator vane position (e.g., positions of the inlet guide vanes 42), compressor air bleed valve positions, shaft (e.g., first shaft 54 and/or second shaft 58) torque and/or rotation speed, etc. so as to control an engine power or performance of the gas turbine engine 22. In some embodiments, the EEC may be part of a full authority digital engine control (FADEC) system for the gas turbine engine 22.

The engine controller 138 of FIGS. 4-9 is connected in signal communication with the metering system 96 to control a flow rate of the jet fuel directed to the combustor 44 by the metering system 96. For example, the engine controller 138 may control the metering system 96 to modulate jet fuel flow to the combustor 44 to attain a desired engine power or performance of the gas turbine engine 22. In some embodiments, as shown in FIGS. 5-9 for example, the engine controller 138 may additionally be connected in signal communication with the IGVA servo 118 to control operation of the IGVA 120 using jet fuel from the jet fuel system 86. The engine controller 138 is configured to facilitate operation of the fuel system assembly 36 (e.g., both the jet fuel system 86 and the hydrogen fuel system 88) in a plurality of different fuel modes. Each of the different fuel modes may include instructions characterizing the operation of the jet fuel system 86 and the hydrogen fuel system 88, together, to direct fuel to the combustor 44, to control operation of the IGVA 120, control cooling of engine oil at the fuel-oil heat exchanger 80, and/or to shut down when not in use for any fuel loads The hydrogen controller 140 of FIGS. 4-9 is configured to control operation of the hydrogen fuel system 88 and its components. The hydrogen controller 140 is connected in signal communication with the metering system 108 (e.g., the metering valve 114) to control a flow rate of the hydrogen fuel directed to the combustor 44 by the metering system 108. For example, the hydrogen controller 140 may control the metering system 108 to modulate hydrogen fuel flow to the combustor 44 to attain a desired engine power or performance of the gas turbine engine 22. In some embodiments, as shown in FIGS. 4 and 5 for example, the hydrogen controller 140 may additionally be connected in signal communication with the IGVA servo 118 to control operation of the IGVA 120 using hydrogen fuel from the hydrogen fuel system 88. The hydrogen controller 140 is additionally connected in signal communication with the engine controller 138, for example, to receive instructions therefrom for controlling operation of the hydrogen fuel system 88 and/or the IGVA servo 118.

Referring to FIGS. 6-8, the engine controller 138 is connected in signal communication with the switching valve 126 to control the fuel source (e.g., the jet fuel system 86 or the hydrogen fuel system 88) used to facilitate cooling for the fuel-oil heat exchanger 80. The engine controller 138 is additionally connected in signal communication with an oil temperature sensor 148 disposed in the oil flow path 72, for example, downstream of the fuel-oil heat exchanger 80. In a first fuel mode (e.g., when the jet fuel system 86 is supplying jet fuel to the combustor 44 for combustion), the engine controller 138 may control the switching valve 126 to direct jet fuel from the jet fuel system 86 through the fuel-oil heat exchanger 80 along the first circuit flow path. In a second fuel mode, (e.g., when the hydrogen fuel system 88 is supplying hydrogen fuel to the combustor 44 for combustion), the engine controller 138 may control the switching valve 126 to direct hydrogen fuel from the hydrogen fuel system 88 through the fuel-oil heat exchanger 80 along the second circuit flow path. In a third fuel mode, the engine controller 138 may control the switching valve 126 to direct jet fuel and hydrogen fuel, from the jet fuel system 86 and the hydrogen fuel system 88 respectively, through the fuel-oil heat exchanger 80 along their separate first and second circuit flow paths. With the hydrogen fuel system 88 directing hydrogen fuel through the switching valve 126 and the fuel-oil heat exchanger 80, the engine controller 138 may issue instructions to the hydrogen controller 140 to modulate hydrogen fuel flow through the fuel-oil heat exchanger 80 (e.g., using the metering valve 114) to maintain a temperature of the oil in the engine oil system 34 (e.g., measured using the oil temperature sensor 148) within a predetermined temperature range.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms “a,” “an,” and “the” refer to one or more than one, unless the context clearly dictates otherwise. For example, the term “comprising a specimen” includes single or plural specimens and is considered equivalent to the phrase “comprising at least one specimen.” The term “or” refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:

a combustor section including a combustor forming a first portion of a core flow path through the aircraft propulsion system;

an engine oil system including a fuel-oil heat exchanger;

a fuel system assembly including a jet fuel system, a hydrogen fuel system and a switching valve, the jet fuel system connected in fluid communication with the combustor and the switching valve, the hydrogen fuel system connected in fluid communication with the combustor and the switching valve, the hydrogen fuel system including a hydrogen fuel metering system and a liquid hydrogen source, the hydrogen fuel metering system connected in fluid communication between the liquid hydrogen source, the switching valve and the combustor, the switching valve in fluid communication with and arranged between the jet fuel system, the hydrogen fuel system and the fuel-oil heat exchanger, and a control system including an engine controller connected in signal communication with the switching valve, the engine controller including a first processing system, the first processing system including a first processor connected in signal communication with a non-transitory first memory storing first instructions which, when executed by the first processor, cause the first processor to:

operate the fuel system assembly in one of a first fuel mode or a second fuel mode; and configure the switching valve with one of a first circuit flow path for the first fuel mode or a second circuit flow path for the second fuel mode, the switching valve with the first circuit flow path configured to direct a jet fuel from the jet fuel system through the fuel-oil heat exchanger, and the switching valve with the second circuit flow path configured to direct a hydrogen fuel from the hydrogen fuel system through the fuel-oil heat exchanger.

2. The aircraft propulsion system of claim 1, wherein the jet fuel system includes a jet fuel metering system connected in fluid communication between the switching valve and the combustor, the jet fuel metering system is connected in signal communication with the engine controller, and the first instructions, when executed by the first processor, cause the first processor to:

control the jet fuel metering system to direct the jet fuel to the combustor.

3. The aircraft propulsion system of claim 1, wherein:

the control system further includes a hydrogen controller connected in signal communication with the engine controller and the hydrogen fuel metering system, the hydrogen controller includes a second processing system, the second processing system includes a second processor connected in signal communication with a non-transitory second memory storing second instructions which, when executed by the second processor, cause the second processor to:

control the hydrogen fuel metering system to direct the hydrogen fuel to the combustor.

4. The aircraft propulsion system of claim 3, wherein the hydrogen fuel system includes a gaseous hydrogen source, and the hydrogen fuel metering system is connected in fluid communication with and between the gaseous hydrogen source, the switching valve, and the combustor.

5. The aircraft propulsion system of claim 4, wherein the hydrogen fuel metering system includes a pressure relief valve and a metering valve, the pressure relief valve is connected in fluid communication with and between the gaseous hydrogen source and a hydrogen inlet of the switching valve, and the metering valve is connected in fluid communication with and between a hydrogen outlet of the switching valve and the combustor.

6. The aircraft propulsion system of claim 3, wherein the hydrogen fuel system further includes pump connected in fluid communication with and between the liquid hydrogen source and the hydrogen fuel metering system, and the hydrogen fuel metering system is connected in fluid communication with and arranged between the pump, the switching valve, and the combustor.

7. The aircraft propulsion system of claim 6, wherein the hydrogen fuel metering system includes a pressure relief valve and a metering valve, the pressure relief valve is connected in fluid communication with and between the liquid hydrogen source and a hydrogen inlet of the switching valve, and the metering valve is connected in fluid communication with and between a hydrogen outlet of the switching valve and the combustor.

8. The aircraft propulsion system of claim 1, further comprising a compressor section forming a second portion of the core flow path, the compressor section includes an inlet guide vane assembly, the inlet guide vane assembly includes a plurality of inlet guide vanes, an inlet guide vane actuator (IGVA), and an IGVA servo, the plurality of inlet guide vanes are positionable to control an air flow direction of an air flow at the second portion of the core flow path, the inlet guide vane actuator is operably coupled with the plurality of inlet guide vanes, the IGVA servo is connected in fluid communication with the inlet guide vane actuator, and the jet fuel system is connected in fluid communication with the IGVA servo.

9. The aircraft propulsion system of claim 8, wherein the engine controller is connected in signal communication with the IGVA servo, and the first instructions, when executed by the first processor, further cause the first processor to:

control the IGVA servo to direct the jet fuel to the inlet guide vane actuator to control a position of the plurality of inlet guide vanes in the first fuel mode and the second fuel mode.

10. The aircraft propulsion system of claim 1, wherein the first instructions, when executed by the first processor, further cause the first processor to:

operate the fuel system assembly in one of the first fuel mode, the second fuel mode, or a third fuel mode; and in the third fuel mode, configure the switching valve with both of the first circuit flow path and the second circuit flow path.

11. An aircraft propulsion system comprising:

a combustor section including a combustor forming a first portion of a core flow path through the aircraft propulsion system;

a heat exchanger;

a fuel system assembly including a jet fuel system, a hydrogen fuel system, and a switching valve, the jet fuel system including a jet fuel metering system connected in fluid communication with the combustor and the switching valve, the hydrogen fuel system including a hydrogen fuel metering system and a liquid hydrogen source, the hydrogen fuel metering system connected in fluid communication between the combustor, the liquid hydrogen source and the switching valve, and the switching valve in fluid communication with and upstream of the heat exchanger, the switching valve configured to switch between a first circuit flow path and a second circuit flow path, the first circuit flow path extending between the jet fuel system and the heat exchanger, and the second circuit flow path extending between the hydrogen fuel system and the heat exchanger; and a control system including an engine controller connected in signal communication with the switching valve, the engine controller including a first processing system, the first processing system including a first processor connected in signal communication with a non-transitory first memory storing first instructions which, when executed by the first processor, cause the first processor to:

operate the fuel system assembly in one of a first fuel mode or a second fuel mode; and configure the switching valve with one of the first circuit flow path for the first fuel mode or the second circuit flow path for the second fuel mode, the switching valve with the first circuit flow path configured to direct a jet fuel from the jet fuel system through the heat exchanger and to the combustor through the jet fuel metering system, and the switching valve with the second circuit flow path configured to direct a hydrogen fuel from the hydrogen fuel system through the heat exchanger and to the combustor through the hydrogen fuel metering system.

12. The aircraft propulsion system of claim 11, further comprising a compressor section forming a second portion of the core flow path, the compressor section includes an inlet guide vane assembly, the inlet guide vane assembly includes a plurality of inlet guide vanes, an inlet guide vane actuator (IGVA), and an IGVA servo, the plurality of inlet guide vanes are positionable to control an air flow direction of an air flow at the second portion of the core flow path, the inlet guide vane actuator is operably coupled with the plurality of inlet guide vanes, the IGVA servo is connected in fluid communication with the inlet guide vane actuator, and the jet fuel system is connected in fluid communication with the IGVA servo.

13. The aircraft propulsion system of claim 12, wherein the engine controller is connected in signal communication with the IGVA servo, and the first instructions, when executed by the first processor, further cause the first processor to:

control the IGVA servo to direct the jet fuel to the inlet guide vane actuator to control a position of the plurality of inlet guide vanes in the first fuel mode and the second fuel mode.

14. The aircraft propulsion system of claim 11, wherein the control system further includes a hydrogen controller connected in signal communication with the engine controller and the hydrogen fuel metering system, the hydrogen controller includes a second processing system, the second processing system includes a second processor connected in signal communication with a non-transitory second memory storing second instructions which, when executed by the second processor, cause the second processor to:

control, in the second fuel mode, the hydrogen fuel metering system to direct the hydrogen fuel to the combustor from the switching valve.

15. The aircraft propulsion system of claim 11, wherein the first instructions, when executed by the first processor, further cause the first processor to:

operate the fuel system assembly in one of the first fuel mode, the second fuel mode, or a third fuel mode; and in the third fuel mode, configure the switching valve with both of the first circuit flow path and the second circuit flow path.

16. An aircraft propulsion system comprising:

a combustor section including a combustor forming a first portion of a core flow path through the aircraft propulsion system;

an engine oil system including a fuel-oil heat exchanger;

a fuel system assembly including a jet fuel system, a hydrogen fuel system and a switching valve, the jet fuel system a low-pressure stage pump, a high-pressure stage pump, and a jet fuel metering system forming a jet fuel flow path, the jet fuel metering system connected in fluid communication with and between the high-pressure stage pump and the combustor, the hydrogen fuel system including a hydrogen fuel flow path, the hydrogen fuel system including a hydrogen fuel source and a hydrogen fuel metering system forming the hydrogen fuel flow path, the hydrogen fuel metering system connected in fluid communication with and between the hydrogen fuel source, the switching valve, and the combustor, and the switching valve configured to switch between a first circuit flow path and a second circuit flow path, the first circuit flow path extending between the jet fuel system and the fuel-oil heat exchanger, and the second circuit flow path extending between the hydrogen fuel system and the fuel-oil heat exchanger; and a control system including an engine controller connected in signal communication with the switching valve, the engine controller including a first processing system, the first processing system including a first processor connected in signal communication with a non-transitory first memory storing first instructions which, when executed by the first processor, cause the first processor to:

operate the fuel system assembly in one of a first fuel mode or a second fuel mode; and configure the switching valve with one of a first circuit flow path for the first fuel mode or a second circuit flow path for the second fuel mode, the switching valve with the first circuit flow path configured to direct a jet fuel from the low-pressure stage pump, through the fuel-oil heat exchanger, and to the high-pressure stage pump along the jet fuel flow path, and the switching valve with the second circuit flow path configured to direct a hydrogen fuel from the hydrogen fuel metering system, through the fuel-oil heat exchanger, and to the hydrogen fuel metering system along the hydrogen fuel flow path.

17. The aircraft propulsion system of claim 16, further comprising a compressor section forming a second portion of the core flow path, the compressor section includes an inlet guide vane assembly, the inlet guide vane assembly includes a plurality of inlet guide vanes, an inlet guide vane actuator (IGVA), and an IGVA servo, the plurality of inlet guide vanes are positionable to control an air flow direction of an air flow at the second portion of the core flow path, the inlet guide vane actuator is operably coupled with the plurality of inlet guide vanes, the IGVA servo is connected in fluid communication with the inlet guide vane actuator, and the jet fuel system is connected in fluid communication with the IGVA servo.

18. The aircraft propulsion system of claim 17, wherein the engine controller is connected in signal communication with the IGVA servo, and the first instructions, when executed by the first processor, further cause the first processor to:

control the IGVA servo to direct the jet fuel to the inlet guide vane actuator to control a position of the plurality of inlet guide vanes in the first fuel mode and the second fuel mode.

19. The aircraft propulsion system of claim 16, wherein the control system further includes a hydrogen controller connected in signal communication with the engine controller and the hydrogen fuel metering system, the hydrogen controller includes a second processing system, the second processing system includes a second processor connected in signal communication with a non-transitory second memory storing second instructions which, when executed by the second processor, cause the second processor to:

control, in the second fuel mode, the hydrogen fuel metering system to direct the hydrogen fuel to the combustor from the switching valve.

20. The aircraft propulsion system of claim 16, wherein the first instructions, when executed by the first processor, further cause the first processor to:

operate the fuel system assembly in one of the first fuel mode, the second fuel mode, or a third fuel mode; and in the third fuel mode, configure the switching valve with both of the first circuit flow path and the second circuit flow path.

* * * * *